US009424199B2

(12) United States Patent
Kegel et al.

(10) Patent No.: US 9,424,199 B2
(45) Date of Patent: Aug. 23, 2016

(54) VIRTUAL INPUT/OUTPUT MEMORY MANAGEMENT UNIT WITHIN A GUEST VIRTUAL MACHINE

(75) Inventors: Andrew G. Kegel, Redmond, WA (US); Mark D. Hummel, Franklin, MA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 334 days.

(21) Appl. No.: 13/597,575

(22) Filed: Aug. 29, 2012

(65) Prior Publication Data

US 2014/0068137 A1    Mar. 6, 2014

(51) Int. Cl.
G06F 12/00    (2006.01)
G06F 12/10    (2016.01)

(52) U.S. Cl.
CPC .......... G06F 12/1009 (2013.01); G06F 12/109 (2013.01); G06F 12/1081 (2013.01)

(58) Field of Classification Search
CPC ............ G06F 9/45553; G06F 9/45558; G06F 2009/45579; G06F 2009/45583; G06F 12/10; G06F 12/1009; G06F 12/1027; G06F 12/1081; G06F 12/109; G06F 12/145
USPC .......................................................... 711/6
See application file for complete search history.

(56) References Cited

U.S. PATENT DOCUMENTS

| 2006/0206687 | A1 | 9/2006 | Vega |
| 2008/0114916 | A1 | 5/2008 | Hummel et al. |
| 2009/0013149 | A1 | 1/2009 | Uhlig et al. |
| 2010/0161847 | A1* | 6/2010 | Riddoch ......................... 710/22 |
| 2011/0022818 | A1* | 1/2011 | Kegel et al. ................... 711/206 |
| 2011/0023027 | A1 | 1/2011 | Kegel et al. |

FOREIGN PATENT DOCUMENTS

WO    WO 2012/058364 A2    5/2012
WO    WO 2012/082864 A1    6/2012

OTHER PUBLICATIONS

International Search Report for International Application No. PCT/US2013/056856, European Patent Office, Netherlands, mailed on Nov. 11, 2013.

* cited by examiner

Primary Examiner — Charles Rones
Assistant Examiner — Nanci Wong
(74) Attorney, Agent, or Firm — Volpe and Koenig, P.C.

(57) ABSTRACT

A virtual input/output memory management unit (IOMMU) is configured to provide a firewall around memory requests associated with an input/output (I/O) device. The virtual IOMMU uses data structures including a guest page table, a host page table and a general control register (i.e., GCR3) table. The guest page table is implemented in hardware to support the speed requirements of the virtual IOMMU. The GCR3 table is indexed using a virtual DeviceID parameter stored in a device table.

11 Claims, 3 Drawing Sheets

VIRTUAL INPUT/OUTPUT MEMORY MANAGEMENT UNIT WITHIN A GUEST VIRTUAL MACHINE

BACKGROUND

The disclosed embodiments relate generally to computer systems, and in particular to memory management units for input/output (I/O) devices.

BACKGROUND ART

Computer systems of various types are ubiquitous in modern society, including personal computers (PCs), workstations, servers, various personal digital assistant (PDA) devices, etc. Most, if not all, of these computer systems have implemented memory management functionality for processor accesses to memory. Generally, the memory management functionality has included translating addresses from a virtual address space used by each process to a physical address space that spans the actual system memory, along with various memory protections (e.g., read only, read/write, privilege level requirements, etc.). The memory management functionality has a variety of uses, such as protecting the memory used by each process from unauthorized access by other processes, permitting large virtual spaces to be used by processes even if the physical memory system is not that large, relocation of virtual addresses to available physical memory without the participation of the process, and the like.

Like processor addresses that are frequently translated, addresses used by input/output (I/O) devices in computer systems can also be translated. That is, the I/O devices can use virtual addresses rather than physical addresses to access memory. Use of virtual addresses rather than physical addresses by devices is preferred in current day systems since it improves the overall security of the system. Use of physical addresses by a rogue device (or a device programmed by a malicious software agent) would result in impeded memory access.

In single operating system (OS) computer systems, such as most PCs, the OS controls access to the I/O devices by other processes (applications and OS services). Accordingly, the OS can control which process has access to a given device at any given point in time, and can at least somewhat control the addresses accessed by the device. Virtual machine systems are more complex, as they may have multiple guest OSs running on a virtual machine monitor. In a virtualized system, many applications and I/O devices access physical memory through the use of virtual addresses. An I/O memory unit is coupled to the I/O devices and the system memory, wherein the IOMMU is configured to translate the virtual address in the device memory request to physical addresses to access the physical system memory.

Modern day computing environments include virtual machine (VM) environments, in which multiple VMs can execute on a single processor system as separate logical operating entities. Typically, these logically separated VMs share common resources of the processor system, such as hardware devices and device drivers. To manage the co-existence of these multiple VMs and to enable exchanging information with common resources and between these VMs, VM environments often use a virtual machine monitor (VMM) or hypervisor.

Security and stability are important issues in most computer systems, and in particular to VM environments. In traditional computer systems, peripheral devices and their associated device drivers have free and unfettered access to memory. Such unfettered access means that a corrupted or malfunctioning device or device driver can write in any location in memory, whether or not that memory location has been set aside for use by that peripheral. Should a memory location set aside for operating system use be overwritten by the malfunctioning device, a system crash will almost inevitably result. Computer system users demand stability, and system crashes due to memory corruption are sought to be minimized.

BRIEF SUMMARY OF THE EMBODIMENTS

What is needed is for a firewall to be constructed around memory allocated to each peripheral device and its associated driver to prevent improper memory access. What is further needed is a virtual IOMMU within a VM to prevent improper memory access in a VM environment. It is further needed that such firewalls be implemented such that the resulting input/output response is suitably rapid.

In some embodiments, a virtualized IOMMU within a guest VM is provided. The virtual IOMMU uses data structures including a guest page table, a host page table and a general control register (e.g., GCR3) table. The guest page table is implemented in hardware to support the speed requirements of the virtual IOMMU. The GCR3 table is indexed using a virtual DeviceID parameter stored in a device table. The formats of the guest page table and the host page table are identical, with a control bit in the device table used to differentiate between different usages of the guest page table.

Further embodiments, features, and advantages of the disclosed embodiments, as well as the structure and operation of the various embodiments are described in detail below with reference to the accompanying drawings.

BRIEF DESCRIPTION OF THE DRAWINGS/FIGURES

The accompanying drawings, which are incorporated herein and form part of the specification, illustrate the disclosed embodiments and, together with the description, further serve to explain the principles of the disclosed embodiments and to enable a person skilled in the relevant art(s) to make and use the disclosed embodiments.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

By way of background, terms such as virtualization and virtual are used in accordance with their meaning in the computing arts. In particular, virtualization refers to techniques used to hide the physical characteristics of an underlying resource so as to simply the approach by which systems, applications and end-users can interact with those resources. For example, virtualization allows a single physical resource (e.g., memory) to appear as multiple logical resources. Thus, virtualization techniques permit a single computer to be able to run a number of virtual machines, with each virtual machine appearing to have its full complement of resources available to it, and without any apparent overlap of resources to other virtual machines.

Figure 1:
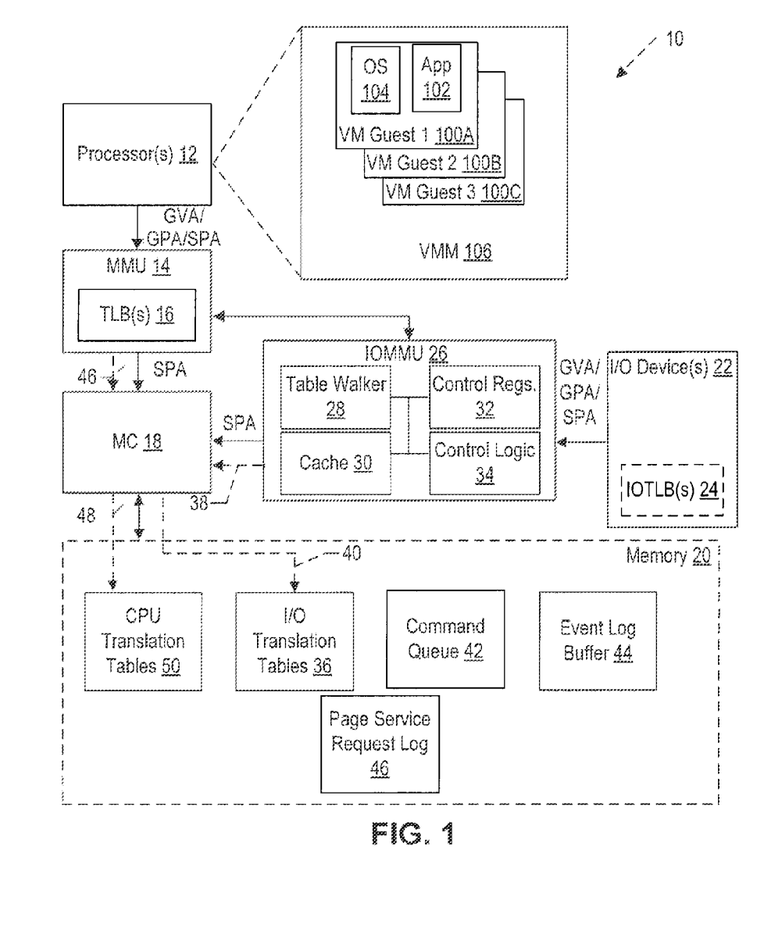
FIG. 1 illustrates a computer system, in accordance with some embodiments.

Referring to FIG. 1, a block diagram is shown that illustrates a simplified, high-level view of a computer system 10, in accordance with some embodiments. As illustrated in FIG. 1, the system 10 includes one or more processors 12, a memory management unit 14 comprising one or more translation lookaside buffers (TLBs) 16, a memory controller (MC) 18, a memory 20, one or more I/O devices 22 which may comprise one or more I/O TLBs (IOTLBs) 24, and an I/O MMU (IOMMU) 26 which may comprise a table walker 28, a cache 30, control registers 32, and control logic 34. The processors 12 are coupled to the MMU 14, which is coupled to the memory controller 18. The I/O devices 22 are coupled to the IOMMU 26, which is coupled to the memory controller 18. Within the IOMMU 26, the table walker 28, the cache 30, the control registers 32, and the control unit 34 are coupled together.

As described further below, the IOMMU 26 may include various features to simplify virtualization in the system 10. The description below will refer to a virtual machine monitor (VMM) that manages the virtual machines (scheduling their execution on the underlying hardware), controls access to various system resources, etc. It is noted that VMMs are also sometimes referred to as hypervisors. In the illustrated embodiment, processor(s) 12 is executing software in a virtualized environment. Accordingly, three virtual machines 100A, 100B, and 100C (e.g., VM 1-3) and a VMM 106 are shown. The number of virtual machines 100 in a given embodiment may vary, and may dynamically change during use as virtual machines are started and stopped by a user. In the illustrated embodiment, the virtual machine 100A includes one or more guest applications 102 and a guest operating system (OS) 104. The OS 104 is referred to as a "guest" OS, since the OS 104 controls the virtual machine 100 created for it by the VMM 106, rather than the physical hardware of the system 10. Similarly, the VM 100B and VM 100C may also each include one or more guest applications 102 and a guest OS 104.

Generally, the applications 102 in the virtual machines 100 use a guest virtual address space and thus, guest virtual addresses (GVA). The guest OS 104 in each virtual machine 100 may manage mappings of the GVA to guest "physical" addresses (GPA) in the virtual machine 100. If the guest OS 104 were running directly on the system 10 hardware, with no VMM, the physical addresses generated by the guest OS 104 would indeed be the system physical addresses (SPA) of the memory locations in the system 10. However, in the virtual machine environment, the VMM 106 may manage the mappings from GPA to SPA. Thus, when processor 12 performs memory requests, the guest OS 104 may manage mappings of GVA to GPA (which may be further mapped to SPA by the VMM 106).

As illustrated in FIG. 1, the path from the I/O devices 22 to the memory 20 is at least partially separate from the path of the processors 12 to the memory 20. Specifically, the path from the I/O devices 22 to memory 20 does not pass through the MMU 14, but instead goes through the IOMMU 26. Accordingly, the MMU 14 may not provide memory management for the memory requests sourced from the I/O devices 22. Generally, memory management may comprise address translation from one type of virtual address (i.e., an address that may be used by software) to a physical address (i.e., an address that may be used by the memory controller) and memory protection. Memory protection may control read and/or write access to the memory at some level of granularity (e.g., a page), along with various other attributes, such as privilege level requirements, cacheability and cache controls (e.g., writethrough or writeback), coherency, etc. Any set of memory protections may be implemented in various embodiments. In some embodiments, the memory protections implemented by the IOMMU 26 may differ from the memory protections implemented by the MMU 14, in at least some respects. In one embodiment, the memory protections implemented by the IOMMU 26 may be defined so that the translation tables storing the translation data used by the IOMMU 26 and the MMU 14 may be shared (although shown separately in FIG. 1 for ease of discussion). As described further below, in some embodiments that share the translation table information, when a particular page has been promoted, such as when privileges change, a table re-walk may be necessary to update translation page tables that may now be unreliable. Other embodiments may not share translation tables between the IOMMU 26 and the MMU 14, as desired.

Generally, the I/O devices 22 may be configured to issue memory requests, such as memory read and write requests, to access memory locations in the memory 20 and in some cases, translation requests. The memory requests may be part of a direct memory access (DMA) read or write operation, for example. The DMA operations may be initiated by software executed by the processors 12, programming the I/O devices 22 directly or indirectly to perform the DMA operations. Depending on the address space in which the software executing on the processor is running, the I/O devices 22 may be provided with addresses corresponding to that address space to access the memory 20. For example, a guest application (e.g., App 102) executing on processor 12 may provide an I/O device 22 with GVAs, while a guest OS executing on processor 12 (e.g., OS 104) may provide GPAs to the I/O devices 22. In either case, when the I/O device 22 requests a memory access, the guest addresses may be translated by the IOMMU 26 to corresponding SPAs to access the memory, and the system physical addresses may be provided to the memory controller 18 for access. That is, the IOMMU 26 may modify the memory requests sourced by the I/O devices 22 to change (i.e., translate) the received address in the request to an SPA, and the memory request may be forwarded to the memory controller 18 to access the memory 20.

In various embodiments, the IOMMU 26 may provide one-level, two-level, or no translations depending on the type of address it receives from the I/O device. More particularly, the IOMMU 26 may perform one-level nested translations or two-level guest translations. That is to say, the IOMMU 26 may provide both GPA to SPA translations (one-level), and GVA to SPA translations (two-level). Thus, as mentioned above, a guest application 102 may provide GVA addresses directly to an I/O device 22 when requesting memory accesses, thereby making conventional VMM interception and translation unnecessary. This functionality may allow advanced computation architectures, such as compute offload, user-level I/O, and accelerated I/O devices, to be used more seamlessly in virtualized systems. It is noted that although one-level, two-level, or no translations are described, it is contemplated that in other embodiments, additional levels of address space may be used. In such embodiments, additional levels of translation (i.e., multilevel translations) may be performed by IOMMU 26 to accommodate the additional address spaces.

As described in greater detail below, the IOMMU 26 has a way of recognizing what type of address it is receiving in a given request. Accordingly, in embodiments in which I/O devices 22 are coupled to IOMMU 26 via standard peripheral buses, such as PCI express (PCIe) interconnects, for example, a process address space identifier (PASID), may be sent to the IOMMU 26 using a transaction layer protocol (TLP) prefix.

The IOMMU 26 may use a number of data structures, such as one or more sets of I/O translation tables 36 stored in the memory 20, to translate the addresses of memory and translation requests from the I/O devices 22. Generally, translation tables 36 may be tables of translation data that can be used to translate addresses from one type to another. The translation tables 36 may store the translation data in any fashion. For example, in one embodiment, the I/O translation tables 36 may include page tables similar to those defined in the x86 and AMD64™ instruction set architectures. Depending on the translation level, various subsets of the guest virtual address bits or guest physical address may be used to index levels of the tables 36, and each level may either be the end of translation (i.e., storing a real page number for the translation) or may point to another table (indexed by another set of address bits). The page may be the unit of translation (i.e., each address in the virtual page translates to the same physical page). Pages may have varying sizes, e.g., from 4 kilobytes up to Megabytes or even Gigabytes.

Figure 3:
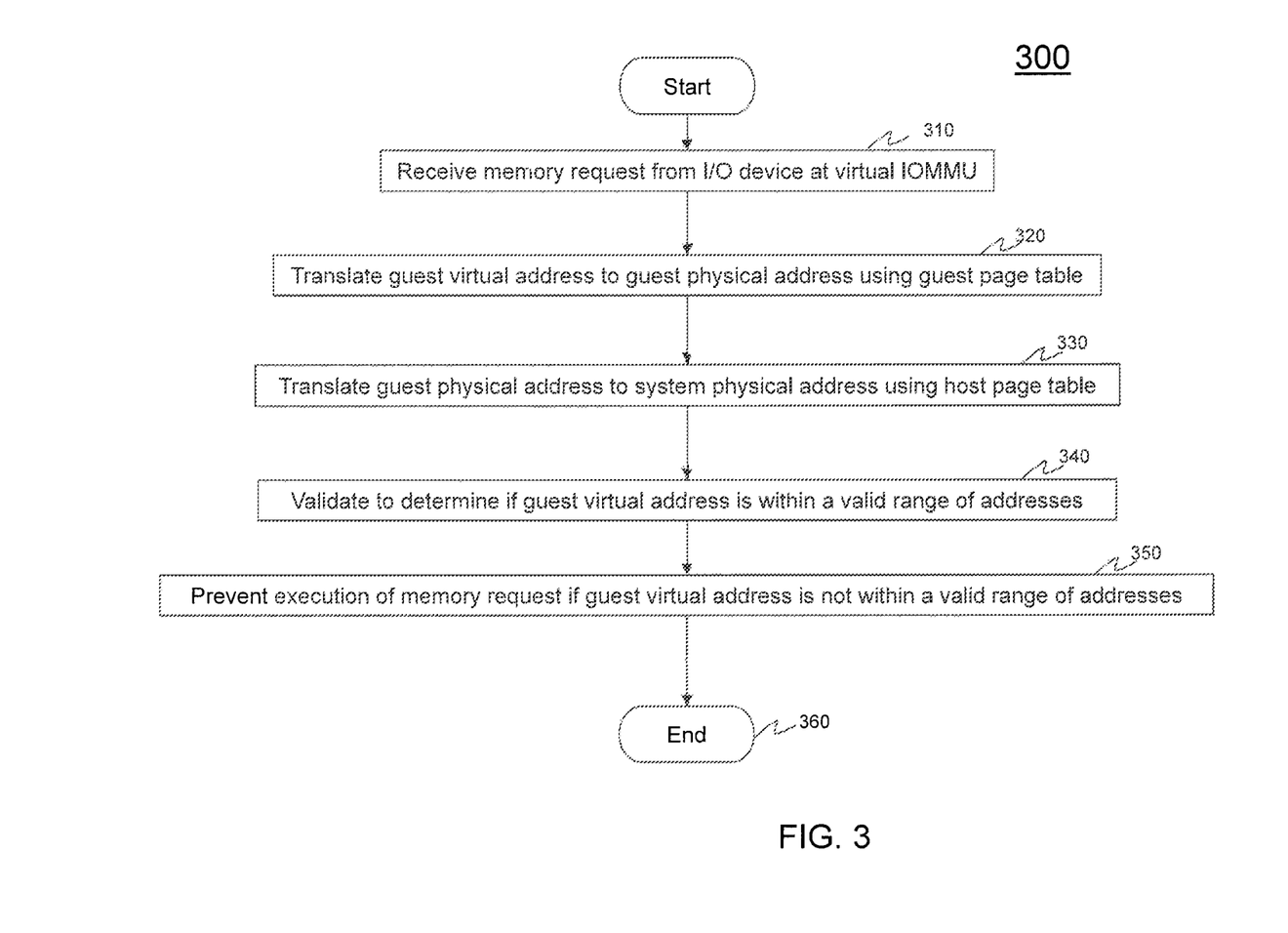
FIG. 3 provides a flowchart depicting a method for memory access by an input/output (I/O) device using a virtual IOMMU, in accordance with some embodiments.

Additionally, the I/O translation tables 36 may include a device table (e.g., as shown in FIG. 3) that maps I/O devices to sets of page tables (e.g., by device identifiers). The device identifier (ID) may be defined in a variety of ways, and may be dependent on the peripheral interconnect to which the device is attached. For example, Peripheral Component Interconnect (PCI) devices may form a device ID from the bus number, device number and function number (BDF). HyperTransport™ (HT) devices may use a bus number and unit ID to form a device ID. As described further below, the device table may include a plurality of entries indexed by the device ID, and each entry may include a pointer to a set of page tables used by the device having the corresponding device ID. In addition, in situations where an I/O device 22 is assigned directly to a process or may run computations in the same address space as a user process, the process address space is identified and provided to the IOMMU 26 to enforce memory isolation protections. In some embodiments, the device table may further include a pointer to an interrupt remapping table (e.g., as shown in FIG. 3) to remap the device's interrupts. Thus, in general, a translation from a GVA or a GPA to an SPA may be stored in one or more entries in one or more translation tables 36, and some of the entries may be shared with other translations. Traversing or "walking" the tables from entry to entry may be part of identifying the translation for the virtual address. In one embodiment, the translation tables 36 may include the interrupt remapping table mentioned above.

Specifically, the IOMMU 26 illustrated in FIG. 1 may include the table walker 28 to search the I/O translation tables 36 for a translation for a given memory request. The table walker 28 may generate memory requests, e.g., read memory requests, to read the translation data from the translation tables 36. The translation table reads are illustrated by dotted arrows 38 and 40 in FIG. 1.

To facilitate more rapid translations, the IOMMU 26 may cache some translation data. For example, the cache 30 may be a form of cache similar to a TLB (or IOTLB), which caches the result of previous translations, mapping guest virtual and guest physical page numbers to system physical page numbers and corresponding translation data. If a translation is not found in the cache 30 for the given memory request, the table walker 28 may be invoked. In various embodiments, the table walker 28 may be implemented in hardware, or in a microcontroller or other processor and corresponding executable code (e.g., in a read-only memory (ROM) in the IOMMU 26). Additionally, other caches may be included to cache page tables, or portions thereof, and/or device tables, or portions thereof, as part of cache 30. Accordingly, the IOMMU 26 may include one or more memories to store translation data that is read from, or derived from, translation data stored in the memory 20.

Figure 2:
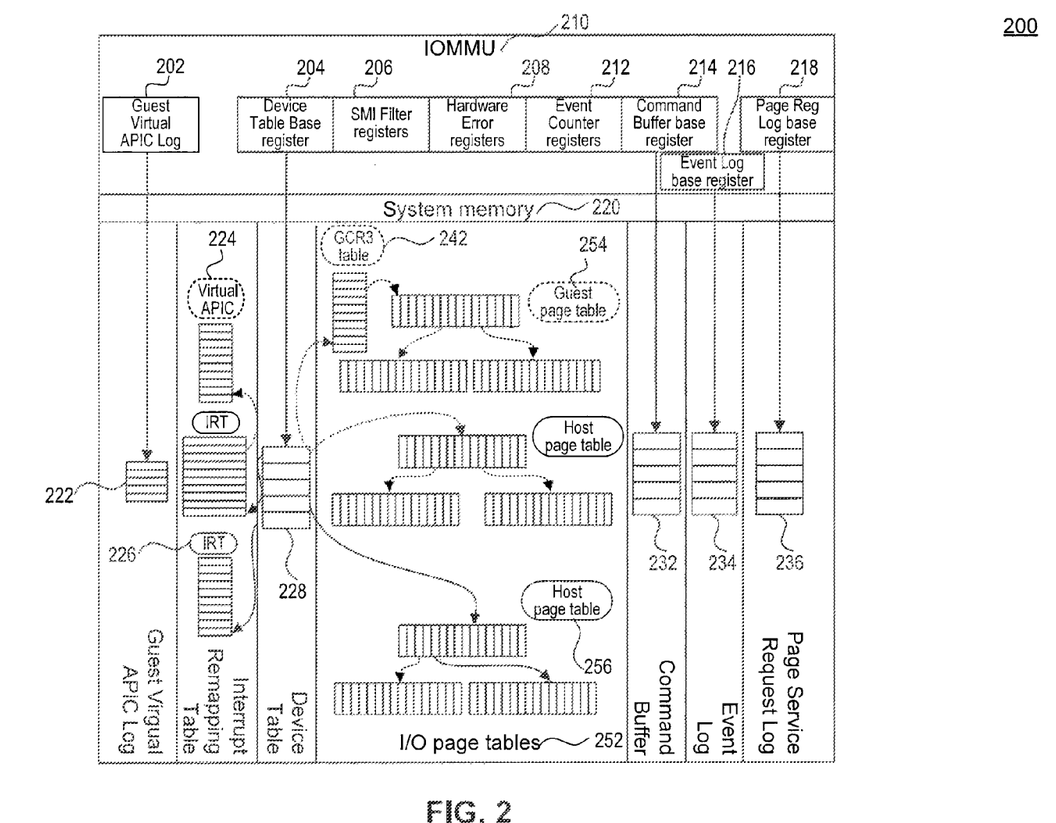
FIG. 2 illustrates an IOMMU architecture, in accordance with some embodiments.

FIG. 2 illustrates further details of an IOMMU architecture, in accordance with some embodiments. For example, cache 30 can include cache versions of I/O page tables 252, device tables 228, and interrupt remapping table (IRT) 226. Cache 30 can also include cache versions of GCR3 table 242. Control registers 32 can include device table base register (DTBR) 204, system management interrupt (SMI) filter registers 206, hardware error registers 208, event counter registers 212, command buffers base register (CBBR) 214, event log base register (ELBR) 216, and page request log base register (PRLBR) 218. Although cache 30 is shown inside IOMMU 26, the scope of embodiments is not limited to such a location. In addition, embodiments include cache 30 being located external to IOMMU 26. At the time of connection of an I/O device, if the IOMMU 210 is detected, software initiates a process of establishing the necessary control and data structures. For example, when IOMMU 210 is set up, the IOMMU 210 can include guest virtual advanced programmable interrupt controller (APIC) log 202, device table base register (DTBR) 204, system management interrupt (SMI) filter registers 206, hardware error registers 208, event counter registers 212, command buffers base register (CBBR) 214, event log base register (ELBR) 216, and page request log base register (PRLBR) 218. Further, during initial set-up, the IOMMU 210 can include an operator for selecting the appropriate guest page table's base pointer register table. The base pointer register table can be, for example, a control register 3 (CR3) 242 which is used by an x86 microprocessor process to translate physical addresses from virtual addresses by locating both the page directory and page tables for current tasks.

In one example, a guest CR3 (GCR3) change can establish a new set of translations and therefore the processor 12 may automatically invalidate TLB entries associated with the previous context. Also, the IOMMU 210 can be associated with one or more TLBs (not shown) for caching address translations that are used for fulfilling subsequent translations without needing to perform a page table walk. Addresses from a device table can be communicated to IOMMU 210.

Once the data structures are set up, the IOMMU 210 may begin to control DMA operation access, interrupt remapping, address translation, etc.

The IOMMU 210 can use memory management I/O (MMIO) to indicate two-level translation is supported. When two-level translation is determined to be supported, the two-level translation is activated by programming the appropriate device table entries (DTE). In nested paging, transactions associated with the DTE can include page table root pointers, which point to the root of the data structures for I/O page tables 252 in memory 220.

In some embodiments, the IOMMU 210 includes a guest virtual advanced programmable interrupt controller (APIC) construct 224. Other embodiments include an IOMMU having architectural features designed to support the virtualized guest APIC.

System 200 can also include memory 220, which includes additional memory blocks (not shown). A memory controller (not shown) can be on a separate chip or can be integrated in the processor silicon. Memory 220 is configured such that DMA and processor activity communicate with memory controller.

In one example, memory 220 includes I/O page tables 252, device tables 228, interrupt remapping table (IRT) 226, command buffers 232, event logs 234, and a host translation module, such as a hypervisor. Cached versions of I/O page tables 252, device tables 228, interrupt remapping table (IRT) 226 are also included in the IOMMU 210. GCR3 table 242 can also be cached in the IOMMU 210, while virtual APIC 224 may also be cached in some embodiments. Memory 220 can also include one or more guest OSs running concurrently, such as guest OS 1 and guest OS 2. Hypervisor and guest OSs 1 and 2 are software constructs that work to virtualize the system.

The guest OSs are more directly connected to I/O devices in the system 200 because the IOMMU 210, a hardware device, is permitted to do the work that the hypervisor, under traditional approaches, would otherwise have to do.

Further, the IOMMU 210 and the memory 220 may be initialized such that DTBR 204 points to the starting index of device table 228. Further, CBBR 214 is associated with the starting index of command buffers 232, such that the IOMMU 210 can read and consume commands stored in the command buffer 232. The ELBR 216 points to the starting index of event logs 234. PRLBR 218 points to the starting index of peripheral page service request (PPSR) tables 236.

The IOMMU 210 can use memory-based queues for exchanging command and status information between the IOMMU 210 and the system processor(s), such as the CPU. The command queue is represented by command buffers 232 in FIG. 2. The command buffer 232 and event logs 234 are implemented by each active IOMMU 210. Also, each IOMMU 210 may implement an I/O page service request queue.

When enabled, in one example the IOMMU 210 intercepts requests arriving from downstream devices (which may be communicated using, for example, HyperTransport™ link or PCI-based communications), performs permission checks and address translation on the requests, and sends translated versions upstream via the HyperTransport™ link to memory 220 space. Other requests may be passed through unaltered.

The IOMMU 210 can read from tables in memory 220 to perform its permission checks, interrupt remapping, and address translations. To ensure deadlock free operation, memory accesses for device tables 228, I/O page tables 252, and interrupt remapping tables 226 by the IOMMU 210 can use an isochronous virtual channel and may only reference addresses in memory 220. Other memory reads originated by the IOMMU 210 to command buffers 232, event log entries 234, and optional request queue entries (not shown) can use the normal virtual channel.

System performance may be substantially diminished if the IOMMU 210 performs the full table lookup process for every device request it handles. Implementations of the IOMMU 210 are therefore expected to maintain internal caches for the contents of the IOMMU 210's in-memory tables. During operation, IOMMU 210 can use system software to send appropriate invalidation commands as it updates table entries that were cached by the IOMMU 210.

In one example, the IOMMU 210 writes to the event logs 234 in memory 220 with the ability to use the normal virtual channel. The IOMMU 210 can optionally write to a peripheral page service request queue 236 in memory 220. Writes to a peripheral page service request queue 236 in memory also can use the normal virtual channel.

In one example, the IOMMU 210 provides for a request queue in memory to service peripheral page requests while the system processor CPU uses a fault mechanism. Any of I/O devices can request a translation from the IOMMU 210 and the IOMMU 210 may respond with a successful translation or with a page fault.

Host OSs may also perform translations for I/O device-initiated accesses. While the IOMMU 210 translates memory addresses accessed by I/O devices, a host OS may set up its own page tables by constructing I/O page tables that specify the desired translation. The host OS may make an entry in the device table pointing to the newly constructed I/O page tables and can notify the IOMMU of the newly updated device entry. At this point, the corresponding IOMMU I/O tables (e.g., from graphics or other I/O devices) and the host OS I/O tables may be mapped to the same tables.

Any changes the host OS performs on the page protection or translation may be updated in both the processor I/O page tables and the memory I/O page tables.

In one example, the IOMMU 210 is configured to perform I/O tasks traditionally performed by exemplary hypervisor. This arrangement eliminates the need for hypervisor intervention for protection, isolation, interrupt remapping, and address translation. However, when page faults occur that cannot be handled by IOMMU 210, IOMMU 210 may request intervention by hypervisor for resolution. However, once the conflict is resolved, the IOMMU 210 can continue with the original tasks, again without hypervisor intervention.

A hypervisor can use the nested translation layer to separate and isolate guest VMs 1 and 2. I/O devices can be directly assigned to any of the concurrently running guest VMs such that I/O devices are contained to the memory space of any one of the respective VMs. Further, I/O devices 22 are unable to corrupt or inspect memory or other I/O devices belonging to the hypervisor or another VM. Within a guest VM, there is a kernel address space and several process (user) address spaces. Using nested translation information, without using the guest translation layer, an I/O device can be granted kernel privileges so that it has relatively free access to the entire contents of the guest VM memory.

To enable user-level (process) I/O and advanced computation models, the guest translation layer can be implemented for separation and isolation of guest processes and I/O. Using guest translation in the IOMMU 210, any of the I/O devices can be directly assigned to a process in a guest VM or an I/O device can run computations in the same address space as a user process. The process address space can be identified to the IOMMU 210 so that the proper translation tables will be used. That is, each memory transaction can be tagged with a process address space ID (PASID). More specifically, an example PASID may be used to identify the application address space within an x86-canonical guest VM. The PASID can be used on an I/O device to isolate concurrent contexts residing in shared local memory.

A device ID can be used by IOMMU 210 to select the nested mapping tables for an address translation or interrupt remapping operation. Together, PASID and device ID are used to uniquely identify an application address space.

As noted above, it is desirable for stability and security reasons to limit the access of an I/O device 22 to only those portions of memory that have been authorized for that I/O device 22. This universal desire applies equally well in a virtualization environment. In a virtualization environment, a hypervisor lies at the bottom of the software stack (i.e., adjacent to the hardware), and it is the hypervisor that controls the actual physical hardware. Through its control of the actual physical hardware, the hypervisor thereby creates the illusion of a dedicated piece of hardware for each piece of software above the hypervisor, even though the hardware may not actually exist. Therefore, by virtue of the hypervisor, each operating system appears to have its own desired access to the required hardware, and thus each operating system operates normally. In addition to satisfying the hardware requirements of each operating system, the hypervisor can also keep certain portions of the hardware secret and hidden from each operating system. Thus, the hypervisor is able to maintain non-overlapping views for each of these operating systems.

The operating systems, also called guest operating systems, have the same device driver access concerns (i.e., security and stability) issues but with one important distinction. That distinction is that the guest operating systems do not have direct hardware access or control. Rather, as noted above, the hypervisor has the responsibility of the host hardware translation in the IOMMU 210. In other words, the host hardware translation information is available to the hypervisor, but such information is not available to the guest operating system. Consequently, in a virtualization environment, the guest operating systems cannot build a firewall around the I/O devices and I/O device drivers in order to ensure hardware access is limited to the authorized domain.

One approach to the construction of a firewall for an I/O device in a virtualization environment is to use virtualization techniques to create a software version of the IOMMU 210. However, such an approach would result in an unacceptably slow solution due to the significant overhead of such a software implementation. Adding further to the unacceptability of a software implementation of a firewall is that there are certain events where software simply cannot intervene. For example, for scenarios where a device driver is functioning correctly but the device itself malfunctions or is corrupted by a virus or the like, software cannot intervene. In particular, software cannot isolate the resulting hardware accesses, since software simply does not have the control mechanism to build such a protection mechanism.

With continuing reference to FIG. 1 and reference again to FIG. 1, in some embodiments, a guest OS 104 is provided with hardware support for a virtual IOMMU within a guest VM 100. This hardware approach allows a guest VM 100 to set up the desired firewall around an I/O device 22 so that the I/O device 22 can read and write only to its authorized memory, and thereby cannot corrupt any other memory. The hypervisor 106 typically uses the nested translation layer to separate and isolate guest VMs 100. An I/O device 22 that is directly assigned to a guest VM 100 is confined to the memory space of that virtual machine. The I/O device 22 is unable to corrupt or inspect memory or peripherals belonging to the hypervisor or another virtual machine. Within the guest virtual machine, there are a kernel address space and several process (user) address spaces. Using nested translation information, an I/O device 22 is usually granted kernel privileges, so that it has relatively free access to the entire contents of the guest virtual machine memory. In order to enable user-level (process) I/O and advanced computation models, the guest translation layer is introduced for separation and isolation of guest processes and I/O. Using guest translation in the virtual IOMMU, an I/O device 22 can be directly assigned to a process in a guest virtual machine or a GPU can run computations in the same address space as a user process.

In some embodiments, the virtual IOMMU uses data structures including a guest page table 254, a host page table 256 and a GCR3 table 242. The virtual IOMMU receives a memory request from an I/O device 22. Such a memory request includes a guest virtual address associated with the I/O device 22. The guest virtual address is translated to a guest physical address through the use of the guest page table 254. The guest OS 104 maintains the guest page table 254. The guest physical address is translated to a system physical address through the use of the host page table 256. The hypervisor 106 maintains the host page table 256.

Thus, the guest page table 254 enforces or validates the use of correct guest virtual addresses by the I/O device 22 in its memory requests. In particular, the guest page table 254 ensures that the guest virtual address is within a valid range of addresses authorized by the guest OS 104 associated with I/O device 22. Should a guest virtual address not fall within a valid range of addresses authorized by the guest OS 104 associated with I/O device 22, then the memory request would be prevented from accessing the erroneous guest virtual address by the guest page table 254.

The guest page table 254 is implemented in hardware to support the speed requirements of the virtual IOMMU, and provides in hardware the enforcement of the firewall. The GCR3 table 242 is indexed using a virtual DeviceID parameter stored in a device table 228. The virtual DeviceID parameter is associated with the I/O device 22. The guest page table 254 is accessed based on the indexed entry in the GCR3 table 242 in the virtual IOMMU.

In some embodiments, the formats of the guest page table 254 and the host page table 256 are identical, and a control bit in the device table 228 used to differentiate between different usages of the guest page table 254 in a virtual IOMMU.

In this embodiment of the virtual IOMMU, virtualization of the constituent parts is realized using both hardware and software approaches. As noted above, the guest page table 254 is realized using hardware to ensure the address translations are performed on a satisfactory timeframe. The virtualization of the other constituent parts in the virtual IOMMU (e.g., host page tables 256, device tables 228, control, configuration and error reporting registers 204, 206, 208, 212, 214, 216, 218, logs 202, 222, 234, 236, and interrupt remapping tables 226) is accomplished using traditional software approaches. These particular elements are not particularly performance sensitive, and therefore the overhead implicit in the use of software virtualization does not present any difficulty in the implementation of a virtual IOMMU.

With respect to the modification of the GCR3 table 242, this table is repurposed to be a virtual GCR3 table. In its traditional configuration, GCR3 table 242 is designed to support GPGPU (i.e., general purpose computing on graphics processing units) computation. In this traditional configuration, the GCR3 table 242 is indexed by PASID (process address space ID). In some embodiments, the GCR3 table 242 is indexed by a virtual DeviceID. Such an indexing arrangement can be accomplished by placing the virtual DeviceID in the device table 228. Other indexing approaches can also be used, as would be recognized by one of ordinary skill in the art.

FIG. 3 provides a flowchart of a method that places a firewall around memory requests that emanate from an I/O device 22, according to some embodiments. It is to be appreciated the operations shown may be performed in a different order, and in some instance not all operations may be required. It is to be further appreciated that this method may be performed one or more processors that read and execute instructions stored on a machine-readable medium.

The process begins at step 310. In step 310, a virtual IOMMU receives a memory request by an input/output (I/O) device. The memory request includes a guest virtual address. In some embodiments, the virtual IOMMU is a virtual implementation of an IOMMU 210. In some embodiments, the address translation information includes one or more of I/O page table entries, device table entries, and interrupt remapping table information.

In step 320, a guest page table (e.g., guest page table 254) in a virtual IOMMU (e.g., a virtual implementation of an IOMMU 210) translates a guest virtual address to a guest physical address. The guest page table 254 is maintained by a guest OS (e.g., OS 104).

In step 330, a host page table (e.g., host page table 256) in the virtual IOMMU 210 translates the guest physical address to a system physical address. The host page table 256 is maintained by a hypervisor (e.g., hypervisor 106).

In step 340, the guest virtual address is validated to determine if it is within a valid range of addresses authorized by the guest OS 104 for an I/O device (e.g., I/O device 22).

In step 350, if the guest virtual address is not within a valid range of addresses authorized by the guest OS 104 for the I/O device 22, then the memory request can be prevented from execution on the virtual machine.

In step 360, method 300 ends.

The embodiments described, and references in the specification to "some embodiments," indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with particular embodiments, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. For example, a virtual IOMMU may be emulated by instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the inventive subject matter such that others can, by applying knowledge within the skill of the art, readily modify and/or adapt for various applications such specific embodiments, without undue experimentation, without departing from the general concept of the inventive subject matter. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method, comprising:
  receiving, by a virtual I/O memory management unit (IOMMU) within a virtual machine (VM), a memory request by an input/output (I/O) device, wherein the memory request includes a guest virtual address and the I/O device is directly assigned to the VM;
  translating, by the virtual IOMMU, the guest virtual address to a guest physical address using a guest page table, the guest page table being maintained by a guest OS (operating system) and accessed based on an indexed entry associated with a virtual I/O device identification in a device table in the virtual IOMMU, wherein the guest page table is implemented in hardware form and the device table is virtualized using software; and
  translating, by the virtual IOMMU, the guest physical address to a system physical address using a host page table, the host page table being maintained by a hypervisor;
  validating, by the virtual IOMMU, the guest virtual address using the guest page table to determine whether the guest virtual address is within a valid range of addresses authorized by the guest OS for the I/O device; and
  if the guest virtual address is not within a valid range of addresses authorized by the guest OS for the I/O device, precluding the memory request from accessing the guest virtual address.

2. The method of claim 1, further comprising:
  identifying an entry in a general control register (GCR3) table indexed by a virtual DeviceID associated with the I/O device, wherein the virtual DeviceID is stored in a device table in the virtual IOMMU.

3. The method of claim 1, further comprising:
  virtualizing at least one of a control register, a configuration register, an error reporting register, a log, and an interrupt remapping table associated with the virtual IOMMU using software.

4. The method of claim 1, further comprising:
  using an identical format for the host page table and the guest page table; and
  using a control bit in the device table to distinguish usage of the guest page table as a host table in virtualization mode.

5. The method of claim 1, further comprising:
  managing a virtual machine by the hypervisor, the virtual machine configured to support operation of the guest OS.

6. An apparatus, comprising:
  a virtual I/O memory management unit (IOMMU) within a virtual machine (VM) configured to receive a memory request transmitted by an input/output (I/O) device, wherein the memory request includes a guest virtual address and the I/O device is directly assigned to the VM, and wherein the virtual IOMMU comprises data structures including:
- a guest page table configured to translate the guest virtual address to a guest physical address, the guest page table being maintained by a guest OS (operating system) and accessed based on an indexed entry associated with a virtual I/O device identification in a device table in the virtual IOMMU, wherein the guest page table is implemented in hardware form and the device table is virtualized using software; and
- a host page table configured to translate the guest physical address to system physical address, the host page table being maintained by a hypervisor;
- wherein the virtual IOMMU is configured to validate the guest virtual address using the guest page table to determine whether the guest virtual address is within a valid range of addresses authorized by the guest OS for the I/O device;
- wherein the guest OS precludes execution of the memory request when the guest virtual address is not within a valid range of addresses authorized by the guest OS for the I/O device.

7. The apparatus of claim 6, further comprising:
a GCR3 table configured to be indexed by a virtual DeviceID associated with the I/O device, wherein the virtual DeviceID is stored in a device table in the virtual IOMMU.

8. The apparatus of claim 6, wherein at least one of a control register, a configuration register, an error reporting register, a log, and an interrupt remapping table associated with the virtual IOMMU are virtualized using software.

9. The apparatus of claim 6, wherein:
the host page table and the guest page table use an identical format; and
the device table uses a control bit to distinguish usage of the guest page table as a host table in virtualization mode.

10. The apparatus of claim 6, further comprising:
a virtual machine configured to support operation of the guest OS, wherein the virtual machines is managed by the hypervisor.

11. A computer-readable storage device having instructions stored thereon, execution of which, by a computing device, causes the computing device to emulate an apparatus comprising:
- a virtual I/O memory management unit (IOMMU) within a virtual machine (VM) configured to receive a memory request transmitted by an input/output (I/O) device, wherein the memory request includes a guest virtual address and the I/O device is directly assigned to the VM, and wherein the virtual IOMMU comprises data structures including:
- a guest page table configured to translate the guest virtual address to a guest physical address, the guest page table being maintained by a guest OS (operating system) and accessed based on an indexed entry associated with a virtual I/O device identification in a device table in the virtual IOMMU, wherein the guest page table is implemented in hardware form and the device table is virtualized using software; and
- a host page table configured to translate the guest physical address to system physical address, the host page table being maintained by a hypervisor;
- wherein the virtual IOMMU is configured to validate the guest virtual address using the guest page table to determine whether the guest virtual address is within a valid range of addresses authorized by the guest OS for the I/O device;
- wherein the guest OS precludes execution of the memory request when the guest virtual address is not within a valid range of addresses authorized by the guest OS for the I/O device.

* * * * *